J. SMITH.
NUT LOCK.
APPLICATION FILED FEB. 4, 1914.
1,139,819.
Patented May 18, 1915.
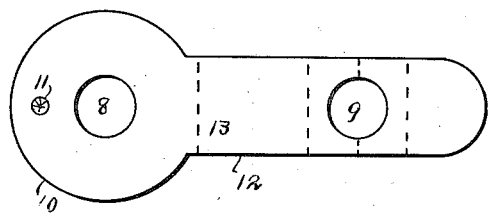
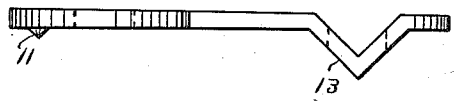
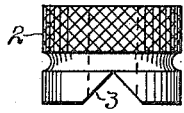 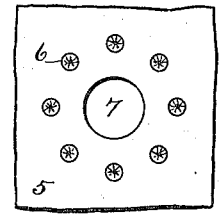
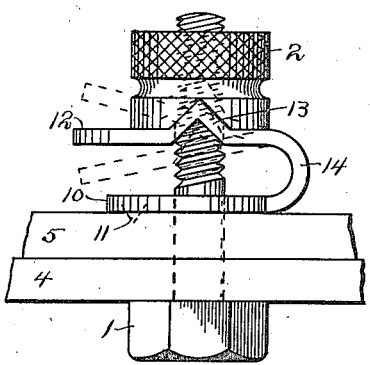
WITNESSES
INVENTOR
John Smith
BY
ATTORNEY

UNITED STATES PATENT OFFICE.

JOHN SMITH, OF NEW YORK, N. Y., ASSIGNOR TO SAID JOHN SMITH AND HENRY UTARD, OF NEW YORK, N. Y.

NUT-LOCK.

1,139,819.  Specification of Letters Patent.  Patented May 18, 1915.

Application filed February 4, 1914. Serial No. 816,605.

*To all whom it may concern:*

Be it known that I, JOHN SMITH, citizen of the United States, and resident of the borough of Brooklyn, county of Kings, city and State of New York, have invented certain new and useful Improvements in Nut-Locks, of which the following is a specification.

The device, the subject of this invention is intended as a simple means for locking nuts against accidental displacement which may be occasioned by the vibration to which a nut will be subjected while in use, and it is my intention in the development of this device to produce a locking means which though exceedingly simple in construction and easy of adjustment is at the same time highly efficient and satisfactory in its operation.

My device operates by means of a certain spring tension and for that reason it is subject to a wide range of adjustment and not limited in the scope of its application.

The construction and advantages thereof will be fully set forth as the specification progresses.

The following is what I consider the best means of carrying out this invention.

The accompanying drawings form a part of this specification, in which—

Figure 1 shows in plan the blank from which my device is to be formed. Fig. 2 is an elevation of the blank after the locking angle has been produced. Fig. 3 shows a nut adapted to be locked by my device. Fig. 4 shows a fractional part of a plate or other member in which portions of the additional locking means are arranged and Fig. 5 shows my completed device in operation.

Similar reference numerals indicate like parts in all the figures where they appear.

In describing my invention I desire it understood that the device may be used in combination or in connection with nuts and bolts of any kind, or upon screw-threaded machine parts that are not truly nor commonly termed nuts and bolts. For the purpose of simplicity and so that the device in its operation may be fully understood I have however elected to show a common ordinary bolt 1, upon which is screw-threaded a thumb-nut 2. The body of this thumb-nut though of ordinary construction is provided with a groove 3, which is a V-shaped groove extending quite across the lower face of the nut, and although this groove cuts away a portion of the threads it is my intention that the relative depth of this groove will not weaken the body of the nut or the holding strength of the threads thereof.

Arranged upon the bolt and between the head thereof and the nut I have shown fractional portions of two plates 4 and 5 and in the upper plate 5, I have shown a plurality of recesses or center punch marks 6 arranged in a circle and surrounding the central perforation 7 through which the bolt will pass. The object of these recesses 6 will be later set forth.

The lock proper comprises a strip of any suitable metal as shown in Fig. 1 but I prefer that the metal should be spring brass or tempered steel as I depend to a certain extent upon the spring tension of this member to produce and maintain an efficient locking of the nut. The plate as I have arranged it is provided with two perforations spaced apart from each other and arranged approximately as shown at 8 and 9. Surrounding the perforation 8, the plate is enlarged and in this enlarged portion and at a suitable point therein I depress the metal downward to form the teat or projection 11. The remainder of the plate 10 is the extension 12 into which the perforation 9 has been formed. In this extension 12 I make an angular bend 13 by depressing the metal of the plate, the apex of the angle should be on a line transverse to the axial line of the perforation 9 in this way two shoulders will be formed extending upwardly one at each side of the perforation 9. The plate is now ready to be bent and in bending I take care that the radius of the bend will not be so small as to destroy the elasticity of the metal. The bend takes place approximately upon the line 13 and results in the formation of the loop 14 shown in Fig. 5. The parts are now ready to be assembled, before assembling however, it will be observed that the bend in the plate has been in a direction that will provide that the angle 13 and the teat 11 project outward or away from each other. In assembling the lock is placed upon the plate 5 so that the teat 11 will enter one of the recesses 6. The nut is next placed upon the bolt and screwed down until sufficient tension is acquired, a further turn then causes the angled portion 13 of the plate 12 to enter the angled recess 3 of the nut 2 and the nut is then reliably locked upon the bolt.

In my experiments I have used this device in securing together small electrical parts which although they must be held in reliable engagement are not subject to great strain, and in this work I have found that the teat 11 and the recesses 6 may be dispensed with and I have also found that particularly thin and light material may be used in forming the locking member. It will also appear obvious that the general shape of the locking member may be changed as desired and that other modifications may be made within the scope of the appended claims without departing from the principle or sacrificing the advantages of this invention.

Having carefully and fully described my invention what I claim and desire to secure by Letters Patent is:—

1. A nut lock having a bolt and a nut operable thereon, said nut being provided with a recess extending across the axial line of said nut, a perforated resilient member provided with a plurality of perforations arranged upon said bolt and provided with a raised portion extending across the axial line of one of said perforations and coöperating with the recess of said nut as and for the purpose set forth.

2. A nut lock consisting of a resilient member folded or bent upon itself so that the ends extend approximately parallel to each other, said resilient member being provided with a plurality of perforations and an angular depression extending across the axial line of one of said perforations as herein specified.

3. A nut lock comprising a resilient metallic member provided with a plurality of perforations and having one end enlarged a depression formed in the smaller portion of said member and a bend produced in said member alining the perforations to allow a screw-threaded part to extend therethrough, said depression lying partly on each of two sides of said screw-threaded part as herein specified.

Signed at New York city, in the county of Kings and State of New York, this second day of February 1914.

JOHN SMITH.

Witnesses:
 Hy. Utand,
 Chas. A. Haviland.